3,192,103
METHOD OF COMBATING NEMATODES
Anthony A. Sousa, Raleigh, N.C., and Henry C. Chitwood and John A. Durden, Charleston, W. Va., assignors to Union Carbide Corporation, a corporation of New York
No Drawing. Filed Apr. 17, 1962, Ser. No. 188,232
32 Claims. (Cl. 167—33)

The present invention relates to a method for combating nematodes and, more particularly, to such a method in which a novel nematocidal composition is applied to the soil.

Heretofore, nematodes have commonly been combated by treating the soil with nematocidal quantities of a mixture of 1,3-dichloropropene and 1,2-dichloropropane. Relatively large quantities of this mixture are required to obtain effectively complete control of nematodes. For example, an application rate of over 200 pounds per acre of the 1,3-dichloropropene and 1,2-dichloropropane mixture is required in order to obtain such effectively complete control.

Accordingly, it is a prime object of the present invention to provide nematocidal compositions having higher levels of effective toxicity than those nematocides heretofore employed.

Another object is to provide nematocidal compositions having long periods of effective toxicity after application at relatively low dosage rates.

Other aims and advantages of the invention will be apparent from the following description and appended claims.

In accordance with the present invention, there is provided the novel method of combating nematodes which comprises applying to the host soil a composition which contains, as an active nematocidal ingredient in quantities toxic to said nematodes, a di-substituted oxadiazole having each organic substituent monovalently bonded to a carbon atom of the oxadiazole nucleus through a carbon atom of the substituent, and at least one of said substituents being halogen substituted. It has been found that di-substituted oxadiazoles have exceptional nematocidal activity when each of the organic substituents is bonded to separate carbon atoms of the oxadiazole nucleus through a carbon atom of the substituent and at least one of said substituents is chlorine substituted.

As employed herein, the term "di-substituted oxadiazole" is employed to designate the compounds having the general formula:

(I) $\quad\quad\quad\quad R—C_2N_2O—R'$ wherein R and R' represent organic substituents each of which is monovalently bonded to separate carbon atoms contained in the oxadiazole nucleus. This formula covers the four isomeric forms of the oxadiazole nucleus (i.e., the 1,2,4-, 1,2,5-, 1,2,3- and 1,3,4-structures). By way of example, the di-substituted 1,2,4-oxadiazole has the following general formula:

(II)
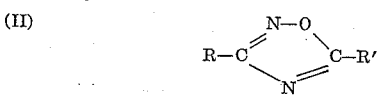

With reference to the above formulas, the R and R' variables in a preferred aspect can represent alkyl which preferably contains up to 18 carbon atoms, e.g., methyl, ethyl, n-propyl, isopropyl, n-butyl, isobutyl, tert.-butyl, n-hexyl, 2-ethylhexyl, dodecyl, octadecyl, and the like; aryl including mono- and polynuclear aromatics which can be fused or bridged aromatics, e.g., phenyl, naphthyl, anthryl, and the like; alkaryl which preferably contains up to 8 carbon atoms, e.g., tolyl, xylyl, ethylphenyl, alkylphenyl, and the like; aralkyl which preferably contains up to 18 carbon atoms, e.g., benzyl, phenethyl, phenylpropyl, phenylbutyl, phenylalkyl, and the like; cycloalkyl which preferably contains from 3 to 7 carbon atoms in the cycloalkyl nucleus, e.g., cyclopropyl, cyclobutyl, cyclopentyl, cyclohexyl, methylcyclopentyl, methylcyclohexyl, alkylcyclopentyl, alkylcyclohexyl, and the like; heterocyclic radicals which preferably contain from 5 to 6 atoms in the heterocyclic nucleus and up to 18 carbon atoms in the radical. More preferably, radicals are employed containing from 1 to 3 hetero atoms in said nucleus such as nitrogen, oxygen, sulphur, and the like; e.g., piperidyl, furyl, tetrahydrofuryl, pyrryl, pyranyl, tetrahydrothienyl, thienyl, tetrahydropyranyl, pyridyl, imidazolyl, oxadiazolyl, triazolyl, oxaziolyl, and the like; alkenyl which preferably contains up to 18 carbon atoms, e.g., allyl, 2-butenyl, 3-butenyl, 2-pentenyl, 3-hexenyl, 3-octenyl, and the like; and the halogenated derivatives of the above exemplified radicals; with the proviso that at least one of the variables is halogen substituted, and preferably is chlorine substituted.

Among the di-substituted oxadiazoles which are eminently desirable and advantageous in the invention are the di-substituted oxadiazoles which contain a nitrogen atom in the 4-position of the oxadiazole nucleus and wherein one of the substituents can be a monovalent hydrocarbon radical containing up to 18 carbon atoms, aralkyl containing up to 18 carbon atoms, alkaryl containing up to 12 carbon atoms, cycloalkyl containing from 5 to 6 carbon atoms in the cycloalkyl nucleus and up to a total of 10 carbon atoms, alkyl containing up to 18 carbon atoms, aryl containing up to 18 carbon atoms, a heterocyclic radical containing from 5 to 6 atoms in the heterocyclic nucleus, said nucleus being composed of carbon atoms and hetero atoms such as oxygen, nitrogen, sulphur, etc., alkenyl containing up to 18 carbon atoms, the mono- and polyhalo substituted radicals enumerated previously in this paragraph, or the nitro substituted aryls or heterocyclics; and wherein the remaining substituent is haloalkyl (which includes mono- and polyhalo-substituted alkyls) containing up to 6 carbon atoms.

The particularly preferred oxadiazoles are those di-substituted oxadiazoles which contain a nitrogen atom in the 4-position of the oxadiazole nucleus and in which the two substituents that are monovalently bonded to separate carbon atoms of the same oxadiazole nucleus can be for, for example: halogenated alkyl, up to 6 carbon atoms, alkyl, up to 4 carbon atoms, chlorinated alkyl, up to 4 carbon atoms, phenyl, and the like, provided that at least one substituent is halogenated.

Specific illustrations of the oxadiazoles which are contemplated in the practice of the invention include, among others:

3-isopropyl-5-trichloromethyl-1,2,4-oxadiazole,
2-phenyl-5-trichloromethyl-1,3,4-oxadiazole,
3-methyl-5-trichloromethyl-1,2,4-oxadiazole,
3-phenyl-5-trichloromethyl-1,2,4-oxadiazole,
3-methyl-5-dichloromethyl-1,2,4-oxadiazole,
3-methyl-5-chloromethyl-1,2,4-oxadiazole,
3-chloromethyl-5-phenyl-1,2,4-oxadiazole,
2-methyl-5-trichloromethyl-1,3,4-oxadiazole,
3-ethyl-5-trichloromethyl-1,2,4-oxadiazole,
3-(γ-trichloropropyl)-5-trichloromethyl-1,2,4-oxadiazole,
3-chloromethyl-5-trichloromethyl-1,2,4-oxadiazole,
3-chloromethyl-5-dichloromethyl-1,2,4-oxadiazole,
3-(2-pyridyl)-5-trichloromethyl-1,2,4-oxadiazole,
3-p-tolyl-5-dichloromethyl-1,3,4-oxadiazole,
3-(2,4-dichlorophenyl)-5-(1,1,-dichloroethyl)-1,2,4-oxadiazole,
3-p-methoxylphenyl-5-trichloromethyl-1,2,4-oxadiazole,
3-cyclopentyl-5-trichloromethyl-1,3,4-oxadiazole,
3-(2-ethylhexyl)-5-dichloromethyl-1,2,4-oxadiazole, 3-isopropyl-5-dibromomethyl-1,2,4-oxadiazole,
2-methoxymethyl-5-trichloromethyl-1,3,4-oxadiazole,
1,2-bis(3-trichloromethyl-1,2,4-oxadiazol-5-yl)ethane,
3-(3'methyloxadiazol-5'-yl)-5-trichloromethyl-1,2,4-oxadiazole,
1,4-bis(5-trichloromethyl-1,2,4-oxadiazol-3-yl)benzene,
3-tert. butyl-5-dichloromethyl-1,2,4-oxadiazole,
2-(4-pyridyl)-5-trichloromethyl-1,3,4-oxadiazole hydrochloride,
3-(2-ethoxyethyl)-5-dibromochloromethyl-1,2,4-oxadiazole,
3-(2-cyanoethyl)-5-trichloromethyl-1,2,4-oxadiazole,
3-(beta-styryl)-5-trichloromethyl-1,2,4-oxadiazole,
2-m-nitrophenyl-5-dichloromethyl-1,3,4-oxadiazole,
3-p-isopropylphenyl-5-trichloromethyl-1,2,4-oxadiazole,
5-(2-phenylethyl)-3-trichloromethyl-1,2,4-oxadiazole,
2-(3,4-methylenedioxyphenyl)-5-trichlorophenyl-1,3,4-oxadiazole,
3-(8,9-dichloroheptadecyl)-5-trichloromethyl-1,2,4-oxadiazole,
3-(2-benzimidazolyl)-5-dichloromethyl-1,2,4-oxadiazole,
2-(2-tetrahydrofuryl)-5-trichloromethyl-1,3,4-oxadiazole,
3-crotyl-5-bromodichloromethyl-1,2,4-oxadiazole,
3-(4-acetoxyphenyl)-5-trichloromethyl-1,2,4-oxadiazole,
2-benzyl-5-trichloromethyl-1,3,4-oxadiazole,
3-(1-acetoxyethyl)-5-trichloromethyl-1,2,4-oxadiazole,
3-(2-furyl)-5-chloromethyl-1,2,4-oxadiazole,
3-glycidyl-5-trichloromethyl-1,2,4-oxadiazole,
3-(4-trichloromethylphenyl)-5-trichloromethyl-1,2,4-oxadiazole,
3-(2-bicyclo[2,2,1],heptyl)-5-trichloromethyl-1,2,4-oxadiazole,
1,2-bis(5-trichloromethyl-1,2,4-oxadiazol-3-yl)ethylene,
5-m-chlorophenyl-3-dichloromethyl-1,2,4-oxadiazole, and
3-acetyl-5-trichloromethyl-1,2,4-oxadiazole.

As is readily apparent from the preceeding discussion and as will become further apparent from the operative data contained herein, it was quite unexpected and surprising, indeed, that a wide and diversified class of di-substituted oxadiazoles would exhibit effective nematocidal activity.

The nematocidal di-substituted oxadiazole compounds of the invention may be obtained by a number of syntheses and the manner of their preparation is not critical. For example, these compounds may be obtained by any of the following syntheses:

(A) By contacting an organic hydroxamyl halide with an organic nitrile at an elevated temperature in the presence of an inert organic medium. The reaction to produce the di-substituted oxadiazole proceeds according to the formula:

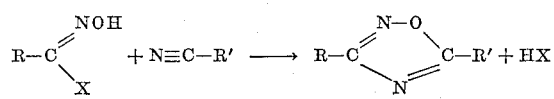

(B) By contacting a molar quantity of organic hydroxamic acid halide with twice the molar quanttiy of an organic imido-ester. The reaction to produce the di-substituted oxadiazole proceeds according to the formula:

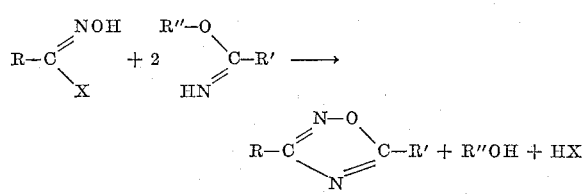

(C) By forming a molar mixture of a salt of an amidoxime with a mineral or organic acid and an organic amide and fusing the mixture. The reaction to produce the di-substituted oxadiazole proceds according to the formula:

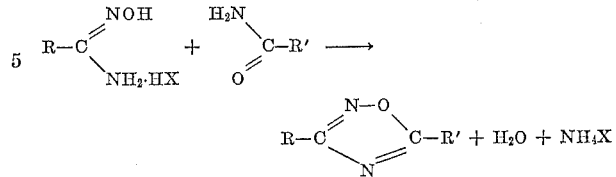

(D) By contacting an organic amidoxime with an organic acid anhydride to produce the di-substituted oxadiazole and an organic acid. The reaction proceeds according to the formula:

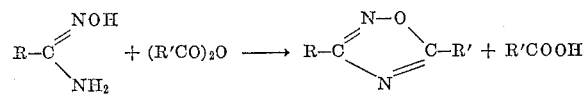

(E) By the two-step process of acylation of an organic amidoxime, followed by cyclization of the acylated amidoxime. The reactions proceed according to the formula:

Step (1)

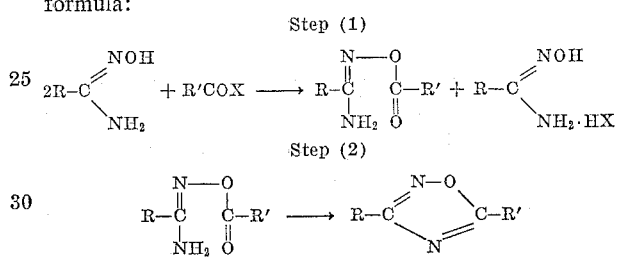

Step (2)

(F) By the two-step process of acylation of organic monohydrazides into dihydrazides and the cyclization of the latter into 1,3,4-oxadiazoles. The reactions proceed according to the formula:

Step (1)

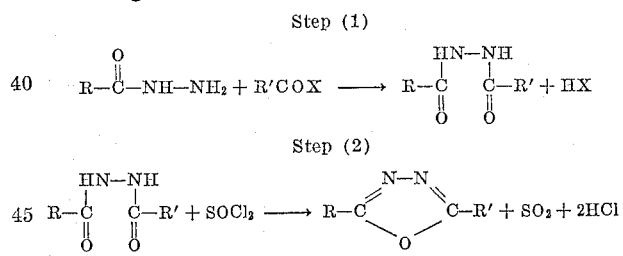

Step (2)

The following illustrative examples set forth data for the synthesis and analysis of a number of specific di-substituted oxadiazole compounds which were subsequently tested and found to have significant nematocidal activity.

EXAMPLE I

*Preparation of 3-isopropyl-5-trichloromethyl-1,2,4-oxadiazole*

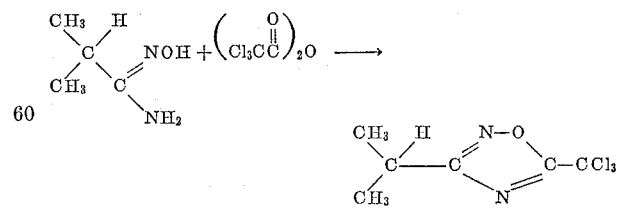

To 92.7 g. (0.3 m.) of trichloroacetic anhydride was added dropwise, with stirring, 15.1 g. (0.15 m.) of 2-methylproprionamidoxime so that the temperature remained at 40–50° C. When the addition was complete the reaction mixture was heated at about 120° C. for one hour and then poured into ice water. This mixture was thoroughly stirred and extracted thoroughly with methylene chloride. The organic extracts were dried over potassium carbonate, filtered, and subsequently distilled to yield a water-white liquid, B.P. 59–60/2 mm., weighing 23 grams and containing a small amount of solid. Filtration and redistillation gave 21 g. (74% yield) of a clear liquid, B.P. 48–49° C./1 mm., n 20.6/D 1.4801.

*Analysis.*—Calc.: C, 31.43%; H, 3.07%; N, 12.02%. Found: C, 31.38%; H, 3.14%; N, 13.01%.

EXAMPLE II

*Preparation of 2-phenyl-5-trichloromethyl-1,3,4-oxadiazole*

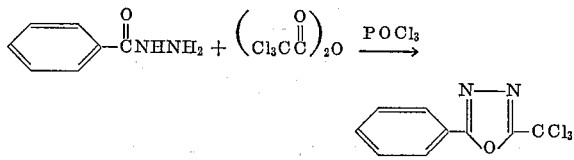

Benzhydrazide (6.8 g., 0.05 m.) was placed in a 125 ml. glass stoppered Erlenmeyer flask and 16 g. (0.05 m.) of trichloroacetic anhydride was added portion wise. A vigorous reaction took place. When the reaction mixture began to cool 40 g. of $POCl_3$ was added and the reaction mixture was heated on the steam bath for four hours. The reaction mixture was then poured over ice and stirred vigorously while the insoluble oil crystallized. The crude product (14 g.) was crystallized from ethanol-water mixture to give 9 g. (68% yield) of a white solid M.P. 65–66.5° C.

*Analysis.*—Calc.: C, 41.02%; H, 1.91%; N, 10.63%. Found: C, 41.58%; H, 2.00%; N, 10.45%.

EXAMPLE III

*Preparation of 3-methyl-5-trichloromethyl-1,2,4-oxadiazole*

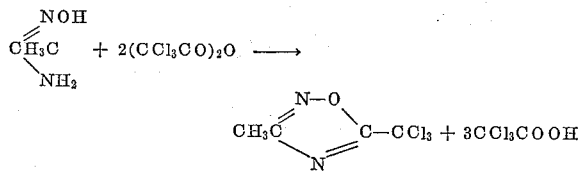

*1st method.*—7.4 g. (0.1 mole) acetamidoxime are added in small portions to 77.25 g. (0.25 mole) trichloroacetic anhydride, while cooling. The mixture is heated to 130–140° for one hour, and then poured into crushed ice. The organic layer is completely removed by extraction with ether, washed with water, with a sodium bicarbonate solution and again with water, dried on sodium sulfate and concentrated. The liquid residue is then fractionated. Yield: 14 g. (70%). B.P.: 54°/5 mm. Hg.

*Analysis.*—Calc. C, 23.82%; H, 1.48%; N, 13.89%. Found: C, 24.11%; H, 1.49%; N, 14.12%.

*2nd method.*—37 g. (0.5 mole) acetamidoxime is dissolved in 320 g. molten trichloroacetic acid; 309 g. (1 mole) trichloroacetic anhydride is added and the mixture heated at 110° during 20 minutes, before pouring it in water. The oily layer is extracted with carbon tetrachloride, washed with water, with a sodium bicarbonate solution, again with water, and dried over sodium sulfate. After evaporating the carbon tetrachloride, the crude material is fractionated. Yield: 84.6 g. (84%). B.P.: 54°/5 mm. Hg.

EXAMPLE IV

*Preparation of 3-phenyl-5-trichloromethyl-1,2,4-oxadiazole*

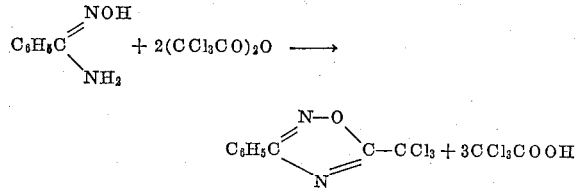

*1st method.*—Starting with 13.6 g. (0.1 mole) benzamidoxime and 77.2 g. (0.25 mole) trichloroacetic anhydride, exactly the same technique is followed as for the preparation of Example III, first method. Yield 18 g. (69%). B.P.: 95–96°/0.01 mm. Hg.

*2nd method.*—Starting with 68 g. (0.5 mole) benzamidoxime and 320 g. trichloroacetic acid and 309 g. (1 mole) trichloroacetic anhydride, exactly the same technique is followed as for the preparation of Example III, 2nd method. Yield: 124 g. (94%).

*Analysis.*—Calc.: C, 40.98%; H, 1.89%; N, 10.60%. Found: C, 41.27%; H, 1.96%; N, 10.48%.

EXAMPLE V

*Preparation of 3-(2-pyridyl)-5-trichloromethyl-1,2,4-oxadiazole*

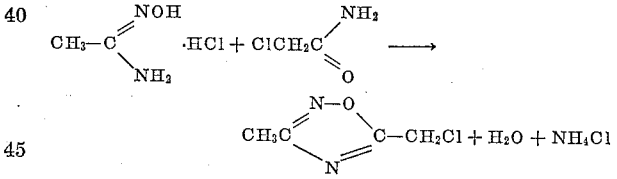

2-picolinamidoxime, 13.7 g. (0.1 mole), is added in small portions to 62 g. (0.2 mole) trichloroacetic anhydride. The mixture is heated to 110° for 1 hour and poured into cold water. The oxadiazole is extracted with methylene chloride, washed with water, with a sodium bicarbonate solution, again with water and dried over calcium chloride. After evaporating the methylene chloride, the residue is distilled (148–160°/2 mm. Hg). The distillate is crystallized from methanol/water. Yield: 18 g. (67%). B.P.: 44–45°.

EXAMPLE VI

*Preparation of 3-methyl-5-chloromethyl-1,2,4-oxadiazole*

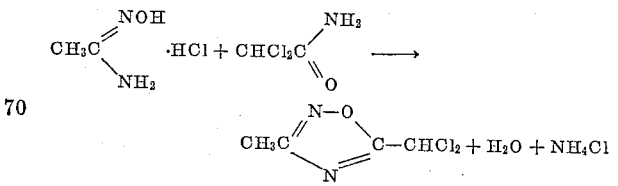

An intimate mixture of 21.8 g. (0.2 mole) acetamidoxime hydrochloride and 18.6 g. (0.2 mole) monochloroacetamide is gradually heated in a distilling flask on an oil bath. Between 165° and 170° the reaction starts and a mixture of the oxadiazole and water distills. The apparatus is then connected with a water pump, while the receiver flask is cooled in Dry Ice bath. The temperature of the oil bath is increased to 180°; the distillation is discontinued when no more product distills. A small amount of patassium bicarbonate is added to the receiving flask for neutralizing small amounts of monochloroacetic acid. The mixture is extracted with ether, after which treatment with anhydrous sodium sulfate is evaporated. The residue is distilled under vacuum. Yield: 16.8 g. (63.5%). B.P.: 112°/90 mm. Hg.

EXAMPLE VII

*Preparation of 3-methyl-5-dichloromethyl-1,2,4-oxadiazole*

Starting from 21.8 g. (0.2 mole) acetamidoxime hydrochloride and 25.6 g. (0.2 mole) dichloroacetamide, exact-

EXAMPLE VIII

*Preparation of 3-chloromethyl-5-phenyl-1,2,4-oxadiazole*

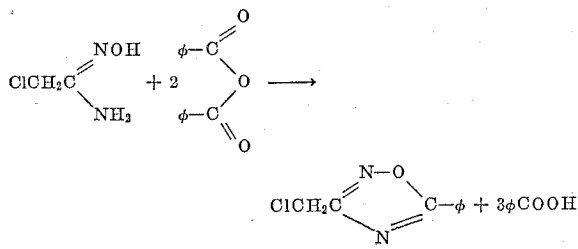

An intimate mixture of 14.6 g. (0.135 mole) monochloroacetamidoxime and 62.5 g. (0.27 mole) benzoic anhydride is heated in an oil bath to 140° C. during 3 hours. When the mixture has cooled off methanol is added and the stirred solution is neutralized with a saturated aqueous solution of sodium bicarbonate. The precipitated oxadiazole is filtered and can be recrystallized from an ethanol/water mixture. Yield: 13.2 g. (50%). M.P.: 58°.

EXAMPLE IX

*Preparation of 2-methyl-5-trichloromethyl-1,3,4-oxadiazole*

A. TRICHLOROACETYLATION OF ACETYL HYDRAZINE $2CH_3CONHNH_2 + CCl_3COCl \rightarrow CH_3CONHNHCOCCl_3 + CH_3CONHNH_2 \cdot HCl$ Trichloroacetyl chloride, 18.2 g. (0.1 mole), in 100 ml. dry chloroform is gradually added to a cooled and stirred solution of 14.8 g. (0.2 mole) acetylhydrazine in 150 ml. dry chloroform. The solution is kept around 5° C. during the addition. A solid separates already in the early steps of the reaction. After all trichloroacetyl chloride has been added the mixture is kept for several hours at room temperature, before the chloroform is removed under vacuum. Water is added to the residue and the mixture extracted with ethyl acetate. The solution is dried over sodium sulfate and the solvent removed under vacuum. The N-acetyl+N'-trichloroacetyl hydrazine is recrystallized from an ethyl acetate-hexane mixture. Yield: 18.4 g. (84%). M.P.: 140° C.

*Analysis.*—Calc.: C, 21.85%; H, 2.28%; O, 14.56%. Found: C, 22.19%; H, 2.28%; O, 14.61%.

B. CYCLIZATION OF N-ACETYL-N'-TRICHLOROACETYL HYDRAZINE

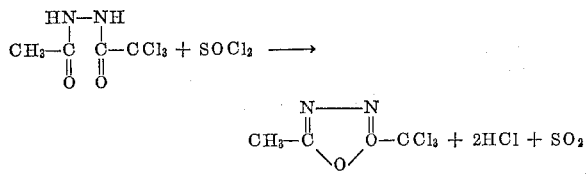

N-acetyl-N'-trichloroacetyl hydrazine, 21.9 g. (0.1 mole), is added to 50 ml. thionyl chloride and the mixture is gently refluxed during 8 hours. Excess $SOCl_2$ and other volatile compounds are then removed under reduced pressure. The residue is fractionated under 2 mm. of mercury pressure. The fraction distilling at 104–106° is recrystallized from petroleum ether. Yield: 8.6 g. (40%). M.P.: 49°.

*Analysis.*—Calc.: C, 23.82%; H, 1.49%; O, 7.94%. Found: C, 23.81%; H, 1.76%; O, 7.89%.

ly the same procedure is used as for the preparation of Example VI. Yield: 25 g. (75%). B.P.: 160°/50 mm. Hg.

EXAMPLE X

*Preparation of 3-γ-trichloropropyl-5-trichloromethyl-1,2,4-oxadiazole*

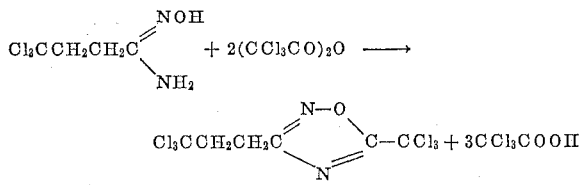

γ-Trichlorobutyramidoxime, 20.5 g. (0.01 mole) is added in small portions to 62 g. (0.2 mole) trichloroacetic anhydride. The mixture is heated during 20 minutes at 100–110° and poured into crushed ice. The organic layer is extracted with methylene chloride, washed with water, sodium bicarbonate solution and again with water and dried over anhydrous sodium sulfate. After evaporating the solvent the product is fractionated in vacuo. Yield: 26.2 g. (40%). B.P.: 112° C./0.4 mm. Hg.

*Analysis.*—Calc.: C, 21.62%; H, 1.20%; N, 8.41%. Found: C, 21.61%; H, 1.14%; N, 8.88%.

EXAMPLE XI

*Preparation of 3-ethyl-5-trichloromethyl-1,2,4-oxadiazole*

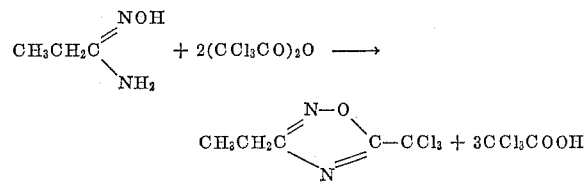

22 g. crude propionamidoxime and 154 g. (0.5 mole) trichloroacetic anhydride are processed according to the technique used for the preparation of compound of Example X. Yield: 20 g. (35% based on the propionitrile used for the preparation of the amidoxime); B.P. 39°/0.5 mm. Hg.

*Analysis.*—Calc.: C, 27.85%; H, 2.32%; N, 13.00%. Found: C, 28.34%; H, 2.50%; N, 12.69%.

EXAMPLE XII

*Preparation of 3-monochloromethyl-5-trichloromethyl-1,2,4-oxadiazole*

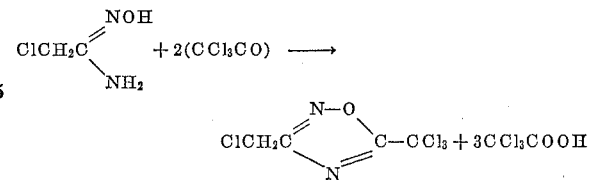

Monochloroacetamidoxime, 15 g. (0.139 mole), is added in small quantities to 88.5 g. (0.278 mole) trichloroacetic anhydride under cooling.

The mixture is heated to 100–110° for 4 hours. The resulting brown solution is poured into crushed ice. The organic layer is separated, dissolved in ether, washed first with an aqueous sodium bicarbonate solution, then with water and finally dried over sodium sulfate. After evaporation of the ether, the residue is dissolved in petroleum ether, and filtered in order to remove small quantities of amides. After evaporating the solvent the product is fractionated. Yield: 19.2 g. (61%). B.P.: 66.5°/1.5 mm. Hg.

*Analysis.*—Calc.: C, 20.18%; H, 0.85%; N, 11.88%. Found: C, 20.33%; H, 0.94%; N, 12.03%.

EXAMPLE XIII

*Preparation of 3-monochloromethyl - 5 - dichloromethyl-1,2,4-oxadiazole*

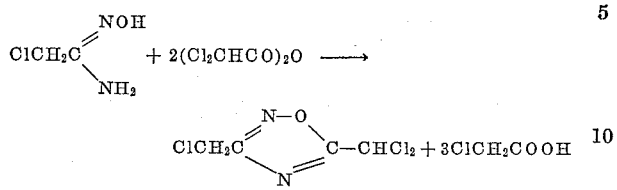

Starting from 15 g. (0.139 mole) monochloracetamidoxime and 66.3 g. (0.278 mole) dichloroacetic anhydride exactly the same technique is followed as for the preparation of Example XII. Yield: 20.8 g. (74.5%). B.P.: 62–64°/0.7 mm. Hg.

*Analysis.*—Calc.: C, 23.82%; H, 1.48%; N, 13.89%. Found: C, 23.54%; H, 1.52%; N, 14.12%.

The following is a description of the screening method employed for all compounds tested for nematode control as well as the screening data obtained for a number of such compounds:

Infective migratory larvae of the root-knot nematode, *Meloidogyne incognita* var. *acrita*, reared in the greenhouse on roots of tomato plants (var. Rutgers), constituted the test organism. This particular nematode incites distinct galls or knots on the roots of certain plants. Infected tomato plants were removed from the stock culture, and these roots were very finely chopped. Standard amounts of this root inoculum were added to a series of pint mason jars, each containing 180 cc. of soil. The jars were capped and incubated for one week at room temperature during which period the nematode eggs hatched and the larval forms migrated into the soil.

A standard formulation of each substituted oxadiazole was prepared by weighing 100 mg. of the compound into 10 ml. of acetone containing a constant emulsifier. These formulations were further diluted with water to produce 10 ml. volumes containing 10 mg., 2.5 mg., and 0.6 mg. of oxadiazole which when added to the jars of soil were approximately equal to rates of 75, 19, and 5 pounds of test compound per acre, respectively. Twenty-five ml. of the test formulation was added to each of two jars for each dosage. Following addition of formulation, the jars were tightly capped, and the contents were thoroughly mixed on a ball mill for five minutes. The jars remained capped for 48 hours after which the contents were transferred to three inch diameter clay pots. The soil was then planted with cucumber seeds; and since cucumber is susceptible to root knot nematode attack, it served as an indicator crop. The pots were then placed in a greenhouse.

After three weeks, the cucumber plants were removed from the pots, the roots were washed free of adhering soil, and directly compared with the roots of similar plants grown in infested but untreated soil. The averaged degree of gall formation on the roots of the cucumber plants was the basis for ascertaining nematode control. The "effective dose" (ED) was visually rated according to the following number designations:

(1) Severe galling; equal to untreated plants
(2) Moderate galling
(3) Light galling
(4) Very light galling
(5) No galling; complete control $ED_3$ values or an effective dose required for a 3 rating was obtained by plotting log concentration of oxadiazole versus probit rating and deriving the concentration of chemical, in pounds per acre, required for 50% control of the root-knot nematode.

The results of these tests, demonstrating the effectiveness of substituted oxadiazoles as nematocides, are presented in Table I.

TABLE I.—TOXICITY OF SUBSTITUTED OXADIAZOLES TO ROOT-KNOT NEMATODE

| Test compound: | Pounds per acre required for |
|---|---|
| 5-chloromethyl-3-methyl-1,2,4-oxadiazole | <5 |
| 3-chloromethyl-5-methyl-1,2,4-oxadiazole | 10 |
| 5-dichloromethyl-3-methyl-1,2,4-oxadiazole | <5 |
| 3-dichloromethyl-5-methyl-1,2,4-oxadiazole | 38 |
| 3-methyl-5-trichloromethyl-1,2,4-oxadiazole | <5 |
| 3-methyl-5-tribromoethyl-1,2,4-oxadiazole | 10 |
| 3-ethyl-5-trichloromethyl-1,2,4-oxadiazole | <5 |
| 3-isopropyl-5-trichloromethyl - 1,2,4 - oxadiazole | <5 |
| 3-tert.butyl - 5 - trichloromethyl - 1,2,4 - oxadiazole | 10 |
| 3-n-nonyl - 5 - trichloromethyl - 1,2,4 - oxadiazole | 75 |
| 3-n-heptadecyl - 5 - trichloromethyl - 1,2,4 - oxadiazole | 38 |
| 3,5-bis(chloromethyl)-1,2,4-oxadiazole | 12 |
| 3-chloromethyl-5-dichloromethyl - 1,2,4 - oxadiazole | <5 |
| 3-chloromethyl-5-trichloromethyl - 1,2,4 - oxadiazole | <5 |
| 5-chloromethyl-3-trichloromethyl - 1,2,4 - oxadiazole | 15 |
| 5-chloromethyl-3-dichloromethyl - 1,2,4 - oxadiazole | 25 |
| 3,5-bis(dichloromethyl)-1,2,4-oxadiazole | 10 |
| 3-dichloromethyl-5-trichloromethyl - 1,2,4 - oxadiazole | 12 |
| 5-dichloromethyl-3-trichloromethyl - 1,2,4 - oxadiazole | 10 |
| 3-allyl-5-trichloromethyl-1,2,4-oxadiazole | 10 |
| 3-(3,3,3-trichloropropyl) - 5 - trichloromethyl-1,2,4-oxadiazole | <5 |
| 3-(1-acetoxyethyl) - 5 - trichloromethyl - 1,2,4-oxadiazole | 12 |
| 5-chloromethyl-3-phenyl-1,2,4-oxadiazole | 54 |
| 3-chloromethyl-5-phenyl-1,2,4-oxadiazole | <5 |
| 5-dichloromethyl-3-phenyl-1,2,4-oxadiazole | 27 |
| 3-phenyl-5-trichloromethyl-1,2,4-oxadiazole | 8 |
| 5-iodomethyl-3-phenyl-1,2,4-oxadiazole | 75 |
| 5-diiodomethyl-3-phenyl-1,2,4-oxadiazole | 19 |
| 3-(4-chlorophenyl) - 5 - trichloromethyl - 1,2,4-oxadiazole | 19 |
| 3-(3-nitrophenyl - 5 - trichloromethyl - 1,2,4-oxadiazole | <19 |
| 3-(4-nitrophenyl - 5 - trichloromethyl - 1,2,4-oxadiazole | <19 |
| 3-(4-methoxybenzyl)-5-trichloromethyl - 1,2,4-oxadiazole | 12 |
| 3-benzyl-5-trichloromethyl-1,2,4-oxadiazole | 12 |
| 3-(4-chlorobenzyl)-5 - trichloromethyl - 1,2,4-oxadiazole | 15 |
| 3-(2-pyridyl)-5-trichloromethyl - 1,2,4 - oxadiazole | 8 |
| 3-(4-pyridyl)-5-trichloromethyl - 1,2,4 - oxadiazole | 10 |
| 3-(2-nitrofur-5-yl) - 5 - trichloromethyl - 1,2,4-oxadiazole | 19 |
| 3-(5-trichloromethyl - 1,2,4 - oxadiazol - 3 - yl) pyridine hydrochloride | 6 |
| Bis-3,3'(5-chloromethyl-1,2,4-oxadiazolyl) | 75 |
| 3-(5-trichloromethyl-1,2,4-oxadiazol - 3 - yl)-5-trichloromethyl-1,2,4-oxadiazole | 75 |
| Bis(5-trichloromethyl-1,2,4 - oxadiazol - 3 - yl) methane | 5 |
| 1,2-bis(3-trichloromethyl - 1,2,4 - oxadiazol - 5-yl)ethane | 10 |
| 1,4-bis(5-trichloromethyl - 1,2,4 - oxadiazol - 3-yl)butane | 75 |

TABLE I.—TOXICITY OF SUBSTITUTED OXADIAZOLES TO ROOT-KNOT NEMATODE—Continued

| Test compound: | Pounds per acre required for ED$_3$ root-knot rating |
|---|---|
| 1,8-bis(3-trichloromethyl-1,2,4-oxadiazol-5-yl)octane | 75 |
| 2-methyl-5-trichloromethyl-1,3,4-oxadiazole | 10 |
| 2,5-bis(trichloromethyl)1,3,4-oxadiazole | 19 |
| 2-phenyl-5-trichloromethyl-1,3,4-oxadiazole | 5 |

The following is a description of the field testing procedures and comparative data for a di-substituted oxadiazole, 3-methyl-5-trichloromethyl-1,2,4-oxadiazole as against an untreated control and control with widely-employed prior nematocidal compositions:

The sandy loam soil of the field experiment was inoculated with root-knot nematode (Meloidogyne sp.) by planting heavily infested tomato plants. These plants were fertilized and cultivated in normal fashion. Two weeks before application of the test compounds, the plants were dug up, and the degree of nematode infection noted as indicated by the degree of root galling. The experimental area was selected from the most severe and most uniformly infested section of the field. This section was rototilled, turning under all of the infected plants, and allowed to remain fallow for two weeks to permit decomposition of the plants.

Randomized plots, 3 x 10 ft., were laid out with five replications per treatment. Acetone solutions containing 7.81 gm., 3.90 gm., and 1.95 gm. of the test compounds were each dispersed in a total volume of one gallon of water. When these were totally applied to the test plots, in the form of drenches, they were approximately equal to rates of 25, 12.5, and 6 pounds of chemical per acre. One standard treatment was prepared by weighing 15.6 gm., 7.8 gm., and 4.9 gm. of 1,2-dibromo-3-chloropropane into acetone and dispersing each into a gallon of water, which when applied was approximately equal to 37, 18, and 12 pounds per acre. The second standard, 1,3-dichloropropene+1,2-dichloropropane mixture, was injected into the soil, 1.7 ml. per injection, at intervals of one foot for a total volume of 51 ml. per plot, equivalent to 200 pounds per acre. Untreated control areas were drenched with one gallon of water-acetone solution each. All plots were rototilled to a depth of six inches immediately after application of the chemicals, and one-half inch of water was applied with sprinkler application.

Seven days after treatment, tomato plants (var. Rutgers) grown in sterilized soil, were transplanted, ten plants per plot. Fifty pounds of nitrogen fertilizer per acre, in the form of ammonium sulfate top dressing, was applied and during the experiment the plants were irrigated so that neither water nor fertilizer would be a limiting factor.

About eight weeks after planting, the tomato plants were individually spaded from the soil, the roots were rinsed and examined for gall formation attributable to nematode attack. The degree of gall formation on the roots of the plants was the basis for ascertaining nematode control. Each plot was visually rated according to the following number designations:

(1) Severe galling; equal to untreated plants
(2) Moderate galling
(3) Light galling
(4) Very light galling
(5) No galling; complete control The averaged results of these tests, demonstrating the effectiveness of the substituted oxadiazoles as nematocides under field conditions are presented in Table II. At the time of the observations, the plants from the untreated checks were found to be dwarfed and their roots were covered with galls attributable to attack of the root-knot nematode.

Counts of the number of free-living root-knot nematodes in the soil were made from each plot before treatment with 3-methyl-5-trichloromethyl-1,2,4-oxadiazole and at one and two month intervals post treatment, using the Baermann funnel technique (G. Baermann, 1917, Geneesk. Tijdschr. Ned.-Ind. 57: 131–137). Five one inch cores, eight inches deep were made on each replicate plot and three subsamples were counted from each replicate. The averaged results, illustrating the reduction in the soil nematode population after treatment are presented in Table III.

TABLE II.—FIELD CONTROL OF ROOT-KNOT NEMATODE WITH SUBSTITUTED OXADIAZOLES

| Test compound | Application rate (pounds/acre) | Average root-knot rating |
|---|---|---|
| 3-methyl-5-trichloromethyl-1,2,4-oxadiazole | 25 | 4.7 |
|  | 12.5 | 3.6 |
|  | 6.25 | 2.5 |
| 1,2-dibromo-3-chloropropane (standard treated control) | 37 | 4.3 |
|  | 18 | 3.7 |
|  | 12 | 2.4 |
| 1,3-dichloropropene + 1,2-dichloropropane mixture (standard treated control) | 200 | 4.9 |
| Untreated control |  | 1.5 |

TABLE III.—FIELD CONTROL OF FREE LIVING ROOT-KNOT NEMATODES WITH SUBSTITUTED OXADIAZOLES

| Test compound | Pre-treatment | | Post-treatment | | | |
|---|---|---|---|---|---|---|
| | | | 1 month | | 2 months | |
| | Application rate (pounds/acre) | No. Nemas/pint soil | No. Nemas/pint soil | Percent original population | No. Nemas/pint soil | Percent original population |
| 3-methyl-5-trichloromethyl-1,2,4-oxadiazole | 25 | 8,796 | 3,659 | 42 | 3,870 | 44 |
|  | 12.5 | 7,001 | 4,293 | 61 | 4,995 | 71 |
| Untreated control |  | 8,191 | 7,271 | 90 | 11,141 | 137 |

It has also been discovered from screening tests that a number of the di-substituted oxadiazole nematocide compounds of this invention also possess other biological activity. For example, it has been found that 3-trichloromethyl-5-methyl-1,2,4-oxadiazole possesses certain systemic (bean rust) and soil fungicidal (Pythium sp.) activity as well as certain systemic insecticidal (Mexican bean beetle) activity. In addition, 3-trichloromethyl-5-phenyl-1,2,4-oxadiazole exhibits acaricidal activity. Further, 3-monochloro-5-phenyl-1,2,4-oxadiazole and 3-phenyl-5-monochloro-1,2,4-oxadiazole have been found to exhibit a broad spectrum of fungicidal activity.

What is claimed is:

1. The method of combating nematodes which comprises applying to the soil a composition which contains, as an active nematocidal ingredient in quantities toxic to said nematodes a member of the group consisting of, di-substituted 1,2,4-oxadiazole and di-substituted 1,3,4-oxadiazole having each organic substituent monovalently bonded to a carbon atom of the oxadiazole nucleus through a carbon atom of the substituent, and wherein both substituents monovalently bonded to the oxadiazole nucleus are selected from the group consisting of alkyl containing up to 18 carbon atoms, aryl, alkaryl containing up to 12 carbon atoms, aralkyl containing up to 18 carbon atoms, cycloalkyl containing from 3 to 7 ring carbon atoms, heterocyclic containing up to 18 carbon atoms and from 5 to 6 atoms in the heterocyclic nucleus and alkenyl containing up to 18 carbon atoms; and at least one of said substituents is halogen substituted.

2. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is aralkyl containing up to 18 carbon atoms and the other substituent is haloalkyl containing up to 6 carbon atoms.

3. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is alkaryl containing up to 12 carbon atoms and the other substituent is haloalkyl containing up to 6 carbon atoms.

4. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is cycloalkyl containing up to 7 carbon atoms in the cycloalkyl nucleus and the other substituent is haloalkyl containing up to 6 carbon atoms.

5. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole wherein one substituent is alkyl containing up to 18 carbon atoms and the other substituent is haloalkyl containing up to 6 carbon atoms.

6. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is aryl containing up to 18 carbon atoms and the other substituent is haloalkyl containing up to 6 carbon atoms.

7. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is heterocyclic containing up to 6 atoms in the heterocyclic nucleus, and the other substituent is haloalkyl containing up to 6 carbon atoms.

8. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is alkenyl containing up to 18 carbon atoms and the other substituent is haloalkyl containing up to 6 carbon atoms.

9. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein both substituents are haloalkyl containing up to 6 carbon atoms.

10. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is alkyl containing up to 4 carbon atoms, and the other substituent is chlorinated alkyl containing up to 4 carbon atoms.

11. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein both substituents are chlorinated alkyl, each substituent containing up to 4 carbon atoms.

12. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is phenyl and the other substituent is chlorinated alkyl containing up to 4 carbon atoms.

13. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is alkyl containing up to 4 carbon atoms and the other substituent is chlorinated methyl.

14. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is chlorinated alkyl containing up to 4 carbon atoms and the other substituent is chlorinated methyl.

15. The method of combating nematodes which comprises applying to the soil a composition which contains, as an active nematocidal ingredient in quantities toxic to said nematodes, a di-substituted oxadiazole selected from the group consisting of 1,2,4- and 1,3,4-oxadiazole, wherein one substituent is ethyl and the other substituent is chlorinated methyl.

16. The method of combating nematodes which comprises applying to the soil a composition which contains, as an active nematocidal ingredient in quantities toxic to said nematodes, a di-substituted 1,2,4-oxadiazole, wherein one substituent is methyl and the other substituent is chlorinated methyl.

17. The method of combating nematodes which comprises applying to the soil a composition containing in quantities toxic to said nematodes, 3-isopropyl-5-trichloromethyl-1,2,4-oxadiazole.

18. The method of combating nematodes which comprises applying to the soil a composition containing in quantities toxic to said nematodes, 2-phenyl-5-trichloromethyl-1,3,4-oxadiazole.

19. The method of combating nematodes which comprises applying to the soil a composition containing in quantities toxic to said nematodes, 3-methyl-5-chloromethyl-1,2,4-oxadiazole.

20. The method of combating nematodes which comprises applying to the soil a composition containing in quantities toxic to said nematodes, 3-phenyl-5-trichloromethyl-1,2,4-oxadiazole.

21. The method of combating nematodes which comprises applying to the soil a composition containing in quantities toxic to said nematodes, 3-methyl-5-dichloromethyl-1,2,4-oxadiazole.

22. The method of combating nematodes which comprises applying to the soil a composition containing in quantities toxic to said nematodes, 3-methyl-5-chloromethyl-1,2,4-oxadiazole.

23. The method of combating nematodes which comprises applying to the soil a composition containing in quantities toxic to said nematodes, 3-chloromethyl-5-phenyl-1,2,4-oxadiazole.

24. The method of combating nematodes which comprises applying to the soil a composition containing in quantities toxic to said nematodes, 2-methyl-5-trichloromethyl-1,3,4-oxadiazole.

25. The method of combating nematodes which comprises applying to the soil a composition containing in quantities toxic to said nematodes, 3-ethyl-5-trichloromethyl-1,2,4-oxadiazole.

26. The method of combating nematodes which comprises applying to the soil a composition containing in quantities toxic to said nematodes, 3-(γ-trichloropropyl)-5-trichloromethyl-1,2,4-oxadiazole.

27. The method of combating nematodes which comprises applying to the soil a composition containing in quantities toxic to said nematodes, 3-chloromethyl-5-trichloromethyl-1,2,4-oxadiazole.

28. The method of combating nematodes which comprises applying to the soil a composition containing in quantities toxic to said nematodes, 3-chloromethyl-5-dichloromethyl-1,2,4-oxadiazole.

29. The method of combating nematodes which comprises applying to the soil a composition containing in quantities toxic to said nematodes, 3-(2-pyridyl)-5-trichloromethyl-1,2,4-oxadiazole.

30. The method of combating nematodes which comprises applying to the soil a composition containing in quantities toxic to said nematodes, 3-methyl-5-tribromomethyl-1,2,4-oxadiazole.

31. The method of combating nematodes which comprises applying to the soil a composition containing in quantities toxic to said nematodes, bis(5-trichloromethyl-1,2,4-oxadiazol-3-yl)methane.

32. The method of combating nematodes which comprises applying to the soil a composition containing in quantities toxic to said nematodes, 3-(2-nitrofuran-5-yl)-5-trichloromethyl-1,2,4-oxadiazole.

References Cited by the Examiner

UNITED STATES PATENTS

| | | | |
|---|---|---|---|
| 2,285,410 | 6/42 | Bousquet | 167—33 |
| 2,918,473 | 12/59 | Sherman | 167—33 |
| 3,090,721 | 5/63 | Uhlenbroek et al. | 167—33 |

FOREIGN PATENTS

| | | |
|---|---|---|
| 626,470 | 7/49 | Great Britain. |
| 881,537 | 11/61 | Great Britain. |
| 1,044,502 | 11/58 | Germany. |

OTHER REFERENCES

Bergmann et al.: Chem. Abstracts, vol. 48, col. 1361 (1954).

Merck, Chem. Abstracts, vol. 42, page 4577 (1948).

JULIAN S. LEVITT, *Primary Examiner.*